T. BROWN.
GEARING FOR MOWING MACHINES.
APPLICATION FILED DEC. 11, 1913.
1,270,487.
Patented June 25, 1918.
2 SHEETS—SHEET 2.
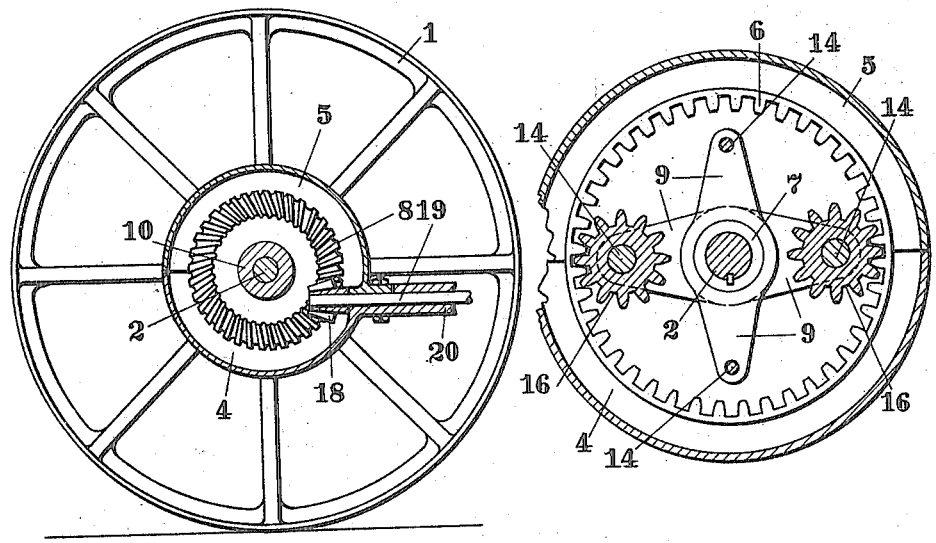
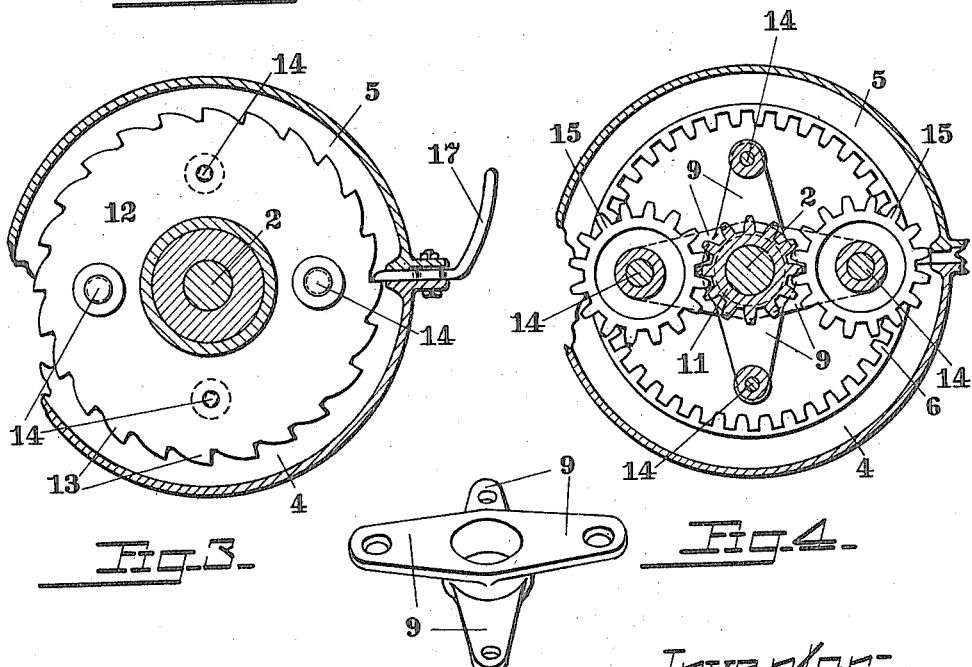

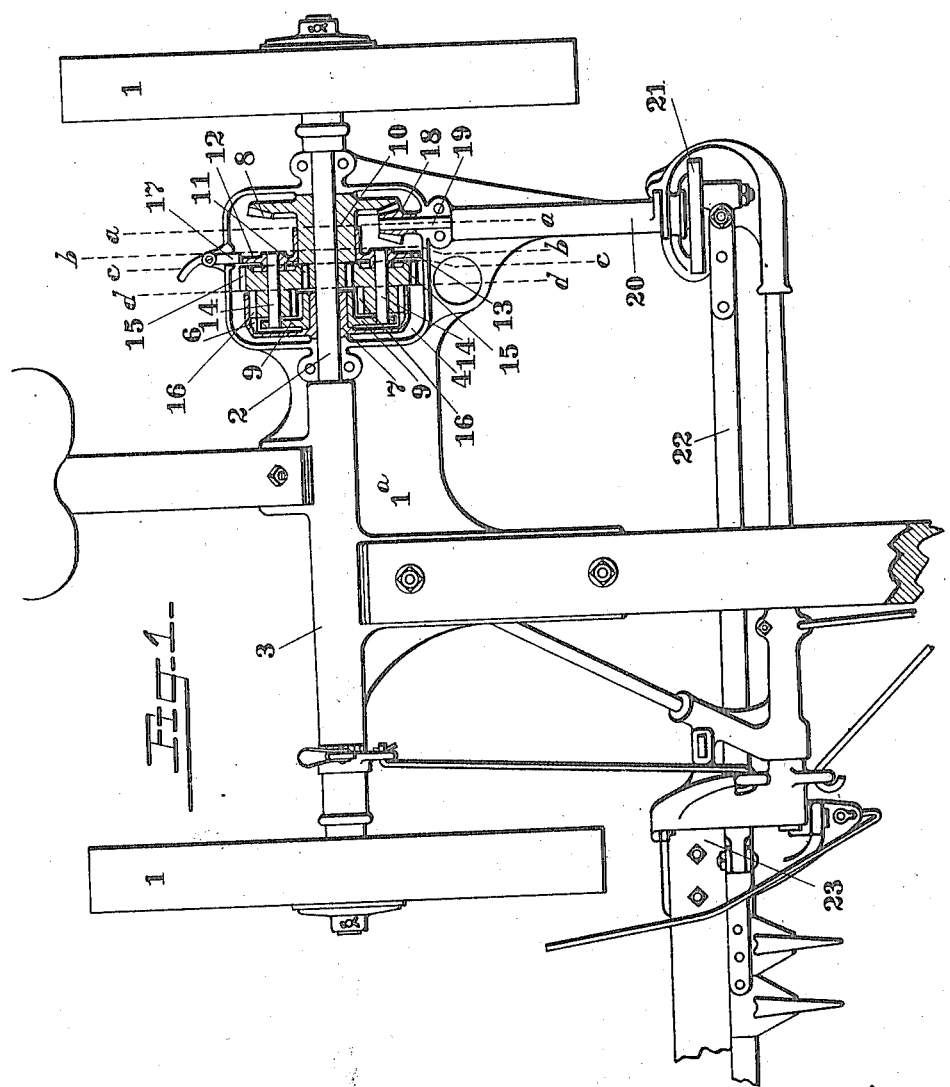

UNITED STATES PATENT OFFICE.

THEOPHILUS BROWN, OF MOLINE, ILLINOIS, ASSIGNOR TO DEERE & COMPANY, OF MOLINE, ILLINOIS, A CORPORATION OF ILLINOIS.

GEARING FOR MOWING-MACHINES.

1,270,487.     Specification of Letters Patent.     Patented June 25, 1918.

Application filed December 11, 1913. Serial No. 806,094.

*To all whom it may concern:*

Be it known that I, THEOPHILUS BROWN, a citizen of the United States, residing at Moline, in the county of Rock Island and State of Illinois, have invented certain new and useful Improvements in Gearing for Mowing-Machines, of which the following is a specification, reference being had therein to the accompanying drawing.

My invention relates to mechanisms in which a reciprocating working device is used which is subjected to great variations in load and resistance, and is driven by a ground actuated motor which varies in its speed and power transmission.

The object of the invention is to provide an improved system of power transmitting gearing which can be interposed between the ground actuated motor and the reciprocating working device.

I have applied my invention to mowing machines with marked success; and I will herein present for illustration a machine of that class.

Referring to the drawings in which similar numerals indicate identical parts—

Figure 1 is a plan view of a mower with the top of the gear case removed and the gearing shown in horizontal section.

Fig. 2 is a section on the line *a—a* of Fig. 1. Fig. 3 is an enlarged detail section on the line *b—b* of Fig. 1. Fig. 4 is an enlarged detail section on the line *c—c* of Fig. 1. Fig. 5 is an enlarged detail section on the line *c—c* looking to the left, and Fig. 6 is an enlarged detail of one of the parts.

Wheels 1 are mounted upon an axle 2 in a manner common to mowing machines so that the axle will revolve when the machine is moving forwardly, and will cease revolving when the machine is backed, it being understood that this is a well known construction and a particular description of which is not thought necessary.

The axle 2 is journaled in a tubular portion 3 of the frame 1ª the latter being provided with a box or casing 4, preferably integral therewith, in which is housed the gearing, and which is provided with a cover 5 secured thereon in any suitable manner so as to exclude dust and prevent the leakage of any lubricant employed with the gears. A driving internal gear 6 is keyed to the axle 2 to revolve therewith continuously, and provided with a hub 7 on which is journaled a member having a plurality of radial arms 9. A skew bevel gear 8 is mounted to revolve freely on the axle 2, and has an elongated hub 10 on the grassward end of which is a pinion 11 preferably integral with the hub 10. Mounted to revolve on the hub 10 is a member 12 having ratchet teeth 13 on its periphery. Rigidly secured in each of the arms 9 are short shafts 14 which extend to the member 12 and are rigidly secured thereto. On the short shafts on two opposite arms 9 are mounted to revolve freely gears 15 which mesh with the gear 11 on the hub 10 of the skew bevel gear 8; integral with the gears 15 are smaller gears 16 which mesh with the internal gear 6. A dog or latch 17 on the casing 4 is adapted to engage with the ratchet teeth on the member 12 to prevent revolution of the latter.

In the operation of my improved gearing to actuate the mowing mechanism, the dog 17 is engaged with the member 12 holding the latter against revolution; the wheels 1 and axle 2 being locked together in a forward movement of the machine, they revolve together imparting a like movement to the internal gear 6 which is keyed to the axle 2; the internal gear 6, engaging with the gears 16, operates the latter to revolve the gears 15, the latter meshing with the gear 11 on the end of the hub 10 of the skew bevel gear 8 causing the latter to revolve and transmit power to the cutting mechanism of the mower through a skew bevel pinion 18 secured on the end of a crank shaft 19, suitably journaled in a tubular bearing 20 forming preferably part of the main frame 1, and carrying on its forward end a crank wheel 21 to which is connected a pitman 22 by which the cutting mechanism 23, of the ordinary type, is operated in a well known manner. By employing a skew bevel gear and pinion to drive the crank shaft, I am enabled to operate the latter in a substantially horizontal position, consequently the ball and socket joint of the pitman with the crank wheel can be substituted by a straight pin connection, simplifying the mechanism and reducing wear to a minimum.

When it is desired that the cutting mechanism shall remain inert during travel of the machine, the dog 17 is disengaged from the member 12 which is then free to revolve on the hub 10; the internal gear 6, being rigidly attached to the axle 2, will continue its revolution therewith, but as the radial arms 9 are connected to the member 12 by the short shafts 14 they are free to revolve with the member 12 carrying the gears 15 which instead of conveying power to the skew bevel gear 8 through the gear 11, revolve freely about the latter, the skew bevel gear and pinion remaining inert until the dog 17 is again engaged with the member 12 when the parts will operate as before described.

In the mechanism which I have illustrated and described, the reciprocating cutter bar may be regarded as a working device which, while in use, is frequently stopped and started suddenly, and which is varyingly though heavily loaded. The drive wheels and axle may be regarded as a ground actuated motor which is also subject to wide variations in speed and inertia. The peculiar train of power transmitting devices which I have interposed between such a motor and such a reciprocating, varyingly loaded, working device is advantageously related to both. In such mechanisms an important desideratum is having the working parts as small and light as possible, and having them made of metal which will permit cheapness of construction, and yet have the inter-engaging parts of the requisite strength and durability.

It will be seen that the train of power-transmitting devices commencing with the prime power wheel on the axle and terminating with the crank is so constructed and related that at no time are the teeth of any one wheel out of mesh with the teeth of its mating wheel; that is to say, the train of power-transmitting devices has each of its parts held bodily fixed longitudinally of the axle in the position which it occupies when at work, and all the parts of the transmitting train are permanently held so that they maintain at all times a power-transmitting relationship of each with all of the others.

Even when the wheels 15 and 16 are not transmitting movement to the wheels 11 and 8, they are still in power-transmitting relationship with the last said wheels. No wheel in the train is movable radially of the shaft, but is held fixedly as to radial distances; nor is it movable longitudinally of the shaft in relation to the others. And, therefore, the power-transmitting relationship referred to is maintained. This avoids the disadvantages incident to those power-transmitting mechanisms in mowers in which the teeth of one or more wheels are suddenly brought into mesh with the teeth of another wheel or wheels, and the disadvantages incident to constructions in which equivalent devices are used, namely, clutch wheels, one having teeth or pins intended to interengage with teeth or the walls of sockets in the other.

What I claim is—

1. The combination with the reciprocating variably loaded, working device, the frame, the two ground wheels, the axle rotated by the wheels, and the prime power wheel driven by the axle, of the train of power-transmitting devices interposed between said prime power wheel and the reciprocating working device to drive the latter, each of the devices of said transmitting train being held bodily fixed longitudinally of the axle and at a fixed distance radially therefrom and all of the parts of the said train being operatively connected together permanently to maintain at all times a power-transmitting relationship with each other, and means optionally interposed between the frame and the devices of the said transmitting train to prevent transmission of power from the prime power wheel to the reciprocating working device without moving any of the devices of said train from power-transmitting relation with all of the others.

2. The combination with the reciprocating variably loaded, working device, the two ground wheels, and the axle, of the prime power-transmitting wheel permanently connected to the axle in fixed position, the bevel wheel loosely mounted on the axle and permanently connected operatively to the working device, the power-transmitting devices interposed between the said fixed wheel and the bevel wheel, each of said transmitting devices being bodily fixed longitudinally of the shaft and all of said devices being connected together permanently in power-transmitting relationship, and means for preventing the transmission of power from the said wheel fixed on the axle to the bevel wheel while the said two wheels and the power-transmitting devices all remain in power-transmitting relationship.

3. The combination with the reciprocating variably loaded, working device, the two ground wheels, and the axle, of the train of gradually faster moving power-transmitting wheels interposed between the ground wheels and the reciprocating working device, each of the said wheels being held bodily fixed in position longitudinally of the axle and all of said wheels being connected together permanently to maintain a power-transmitting relationship of each with all the others, the relatively slowly moving wheels at the power-receiving end of said train moving continuously with one or both of the ground wheels, and means for stopping the movement of the relatively faster moving wheels of said train without moving any of them out of power-transmitting relations with the relatively slower moving wheels.

4. The combination of a frame, an axle journaled thereon having supporting wheels with which it revolves in a forward direction, a reciprocating, variably loaded, working device, a crank shaft to transmit power to the reciprocating working device, a bevel pinion on the crank shaft, a bevel gear loosely mounted on the axle and permanently meshing with the bevel pinion on the crank shaft, a gear wheel fixed bodily, in one position on the axle, a train of gear wheels supported on the axle and rotatable in relation to the axle, the bevel gear and the said fixed gear, all the wheels of the said train being permanently connected to each other, to the fixed gear and to the bevel gear to maintain at all times a power-transmitting relationship and each wheel of said train being held bodily fixed in position longitudinally of the axle, and a stop carried by the frame for stopping the rotation bodily of the gears of the said train.

5. The combination of a frame, an axle journaled therein having supporting wheels with which it revolves in a forward direction, a reciprocating variably loaded, working device, a crank shaft to convey power to the reciprocating working device, a bevel pinion on the crank shaft, a bevel gear mounted loosely on the axle and meshing with the bevel pinion on the crank shaft, an internal gear rigidly mounted on the axle, a pinion loose on the axle and permanently connected rigidly to the loose bevel gear, intermediate gears meshing with and driven by the fixed internal gear and permanently meshing with said loose pinion, said intermediate gears being mounted on axes eccentric to the axle and adapted to rotate bodily around the axle when not transmitting power to the loose bevel gear and to be held bodily stationary relatively to the frame when rotating to transmit power, and a movable stopping device on the frame for holding said intermediate gears from rotating bodily around the axle.

6. In a mowing machine, the combination of a frame, an axle journaled thereon and having supporting wheels with which it revolves in a forward direction, a cutting mechanism, a fixed gear on said axle, a bevel gear revoluble on said axle and having an elongated hub, a pinion on said hub and movable therewith, a member journaled on the elongated hub, a plurality of arms radial to said axle and connected to said member, gears revoluble on said connections and meshing with the pinion on the hub of the bevel gear, a longitudinally disposed crankshaft on the frame to operate the cutting mechanism, a bevel pinion on said shaft engaging with the bevel gear, and means to hold at will said radial arms and connected member stationary during the forward revolution of the axle.

7. In a mowing machine, the combination of a frame, an axle journaled thereon and having supporting wheels with which it revolves in a forward direction, a cutting mechanism, a gear fixed on the axle, a bevel gear revoluble on the axle and having an elongated hub, a pinion on said hub, a circular member intermediate the pinion and bevel gear and loose on said hub, a crank shaft to operate the cutting mechanism and having a bevel pinion engaging with the bevel gear, gearing on the circular member in continuous intermesh with the fixed gear and the pinion on said hub, a series of teeth in the periphery of said member, and a dog adapted to engage said teeth to hold said member in a fixed position.

8. In a mower, the combination of a frame, an axle journaled thereon, ground wheels operating singly or together to rotate the axle, a cutter, a train of power transmitting gearing supported on the axle and permanently connected with the cutter to operate the latter by power from the ground wheels, said gearing comprising a primary gear fixed to the axle, a secondary gear loosely mounted on the axle and permanently connected with the cutter, a member loosely mounted on the axle, intermediate gearing supported on said member and in constant mesh with the primary and secondary gears, means to hold said member immovable during operation of the cutter, and means operable at will to release said member to check the transmission of power to the cutter.

9. In a mower, the combination of a frame, an axle journaled thereon, ground wheels operating singly or together to rotate the axle, a cutter, a train of power transmitting gearing mounted on the axle in constant operative relation and permanently connected with the cutter to operate the latter by power from the ground wheels, and a foot lever operable to check the transmission of power to the cutter while the latter is in operation.

In testimony whereof I affix my signature in presence of two witnesses.

THEOPHILUS BROWN.

Witnesses:
JESSIE L. SIMSER,
W. G. DUFFIELD.